INVENTORS
D. A. FLUEGEL
P. R. HINRICHS

BY

*Young + Quigg*

ATTORNEYS

Aug. 4, 1964

D. A. FLUEGEL ETAL 3,143,643

SEQUENTIAL ANALOG COMPUTING APPARATUS

Filed April 6, 1962

INVENTORS
D.A. FLUEGEL
P.R. HINRICHS

BY

*Young & Quigg*
ATTORNEYS

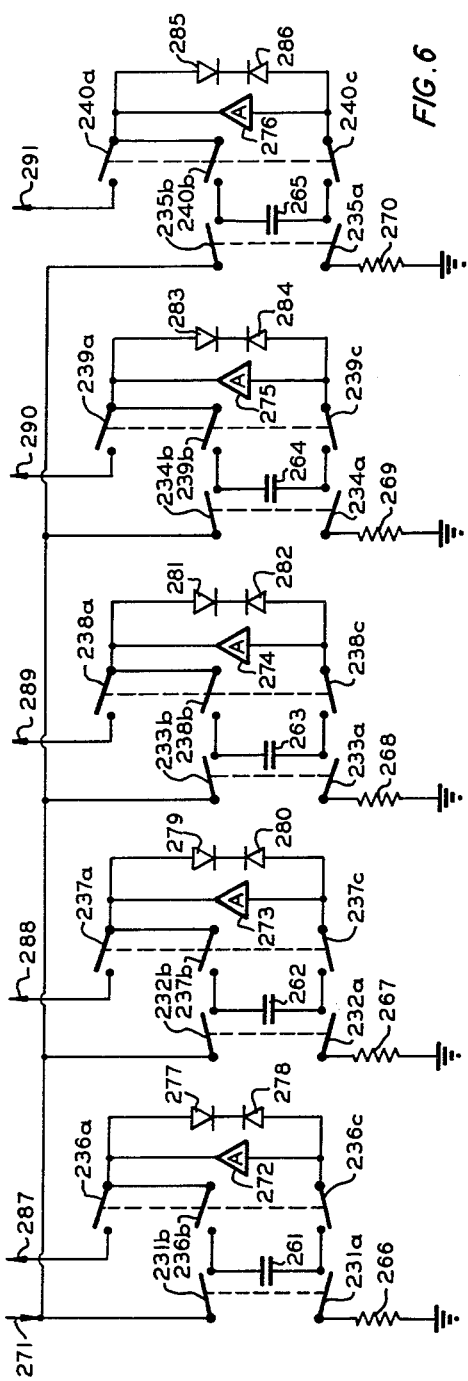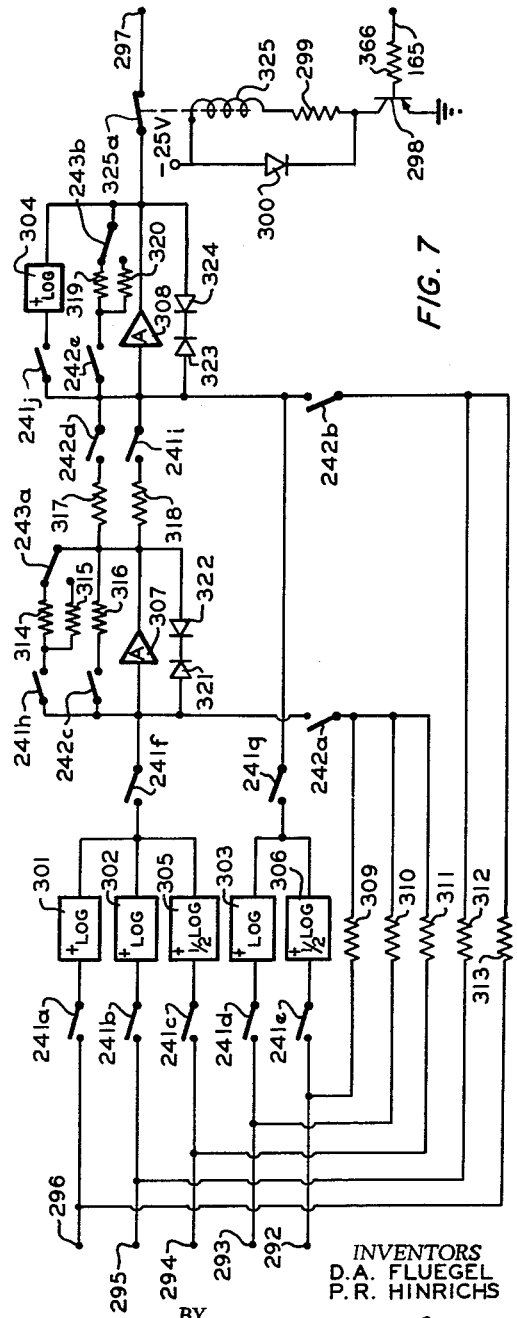

INVENTORS
D.A. FLUEGEL
P.R. HINRICHS

BY

*Young + Quigg*
ATTORNEYS

United States Patent Office 3,143,643
Patented Aug. 4, 1964

3,143,643
SEQUENTIAL ANALOG COMPUTING APPARATUS
Dale A. Fluegel and Paul R. Hinrichs, Bartlesville, Okla., assignors to Phillips Petroleum Company, a corporation of Delaware
Filed Apr. 6, 1962, Ser. No. 185,597
6 Claims. (Cl. 235—150)

This invention relates to method and apparatus for performing analog computations by sequentially selecting groups of analog computing elements. In one aspect the invention relates to method and apparatus for computing a variable of a process stream, such as the enthalpy of the feed to a fractionation column. In another aspect the invention relates to method and apparatus for computing and controlling the enthalpy of a process stream. In another aspect the invention relates to method and apparatus for computing and/or controlling the reflux in a fractionation column. In a further aspect the invention relates to method and apparatus for computing and/or controlling the bottom product flow from a fractionation column.

In various industrial processes it is a common practice to heat a process stream by indirectly heat exchanging it with a liquid heat exchange medium and a condensable vaporous heat exchange medium. For example, in the case of fractionation or distillation columns of many chemical and petroleum processes the feed introduced into the column is first indirectly heat exchanged with the bottom product of the column and then indirectly heat exchanged with steam. In these processes it becomes necessary for efficient and economical operation to maintain the enthalpy or heat content of the thus heated feed stream at a constant value for a given operation.

The conventional method of controlling the heat content of such a process stream is to measure the temperature of the heated process stream and accordingly control the flow of the heat exchange medium in order to hold the temperature of the process stream constant. While this may be satisfactory in many operations, for example, where the heated process stream is in the liquid state or its composition is substantially constant, in many other operations such temperature control is unsatisfactory as a means for controlling feed enthalpy. Where the feed rate of the process stream changes, or where the process stream must be heated to its bubble point or must be partially vaporized, any variations in feed flow, initial feed enthalpy, steam, stream supply conditions, or bottom product flow may give rise to substantial changes in feed enthalpy with very little or no change in feed temperature. For example, certain fractionation processes can be carried out with maximum efficiency when a preselected fraction of the feed mixture is introduced into the column in the vapor state. In particular, the capacity of the column generally exhibits a maximum for any particular feed mixture when some preselected fraction of the feed is vaporized prior to being introduced into the column. Again, in such fractionation processes temperature measurement of a partially vaporized stream is not an accurate determination of feed enthalpy. Thus, there has risen a need for a more efficient and responsive method and apparatus for computing and controlling the enthalpy of a process stream, such as the feed to a fractionation column, which feed is first indirectly heat exchanged with the bottom product of the column and then indirectly heat exchanged with steam prior to the entry of such heated feed to the column.

In many fractionating operations, it is often desirable to remove a bottom product of predetermined composition. However, this is difficult to achieve with the conventional system utilizing only a liquid level control on the bottom product withdrawal due to changes in the rate of flow of feed input and/or changes in feed composition. Another difficulty encountered in the operation of fractionation columns is the effect of variations in feed rate of flow, feed composition, overhead temperature, reflux temperature and/or feed enthalpy on the amount of reflux required to achieve the desired separation.

In accordance with the invention there is provided a method and apparatus for performing analog computations by sequentially selecting groups of analog computing elements. The computing process is broken up into discrete steps which can be solved in a programmed sequence utilizing only a few computing elements. A stepping switch is utilized in conjunction with a series of relays to connect the computing elements in the desired configuration for the solution of each step in the computing process. Answers obtained at the end of each step can be stored in capacitors as analog voltages. These stored answers can then be utilized during subsequent computing steps to further the solution of an equation. This process is continued until the solution to the equation is obtained. The solution can be stored in a hold circuit. A hold circuit can be utilized for each equation for which an output is desired.

Still further in accordance with the invention, there is provided a control system utilizing the sequentially operated analog computer which computes and compensates for all or substantially all of the disturbances which are encountered in controlling one or more fractionation systems.

Accordingly, it is an object of the invention to provide a sequentially operated analog computer. Another object of the invention is to provide an improved analog computer utilizing only a few computing elements. Another object of the invention is to reduce the number of computing elements required for the solution of a problem. Another object of the invention is to provide an improved computing method and apparatus for solving a plurality of different equations. Another object of the invention is to provide an improved control system for a fractionation column. A still further object of the invention is to provide a computer for controlling a plurality of fractionation columns. Other aspects, objects and advantages of the invention will be apparent from a study of the disclosure, the drawing, and the appended claims.

In the drawings, FIGURE 1 is a schematic representation of a control system for a fractionation column utilizing the present invention.

FIGURE 4 is a timing diagram of a typical operation of the timing unit of FIGURE 3.

FIGURE 5 is a schematic representation of a relay control system which can be utilized in the system of FIGURE 2.

FIGURE 6 is a schematic representation of an arithmetic storage which can be utilized in the system of FIGURE 2.

FIGURE 7 is a schematic representation of an arithmetic unit which can be utilized in the system of FIGURE 2.

Figure 1:
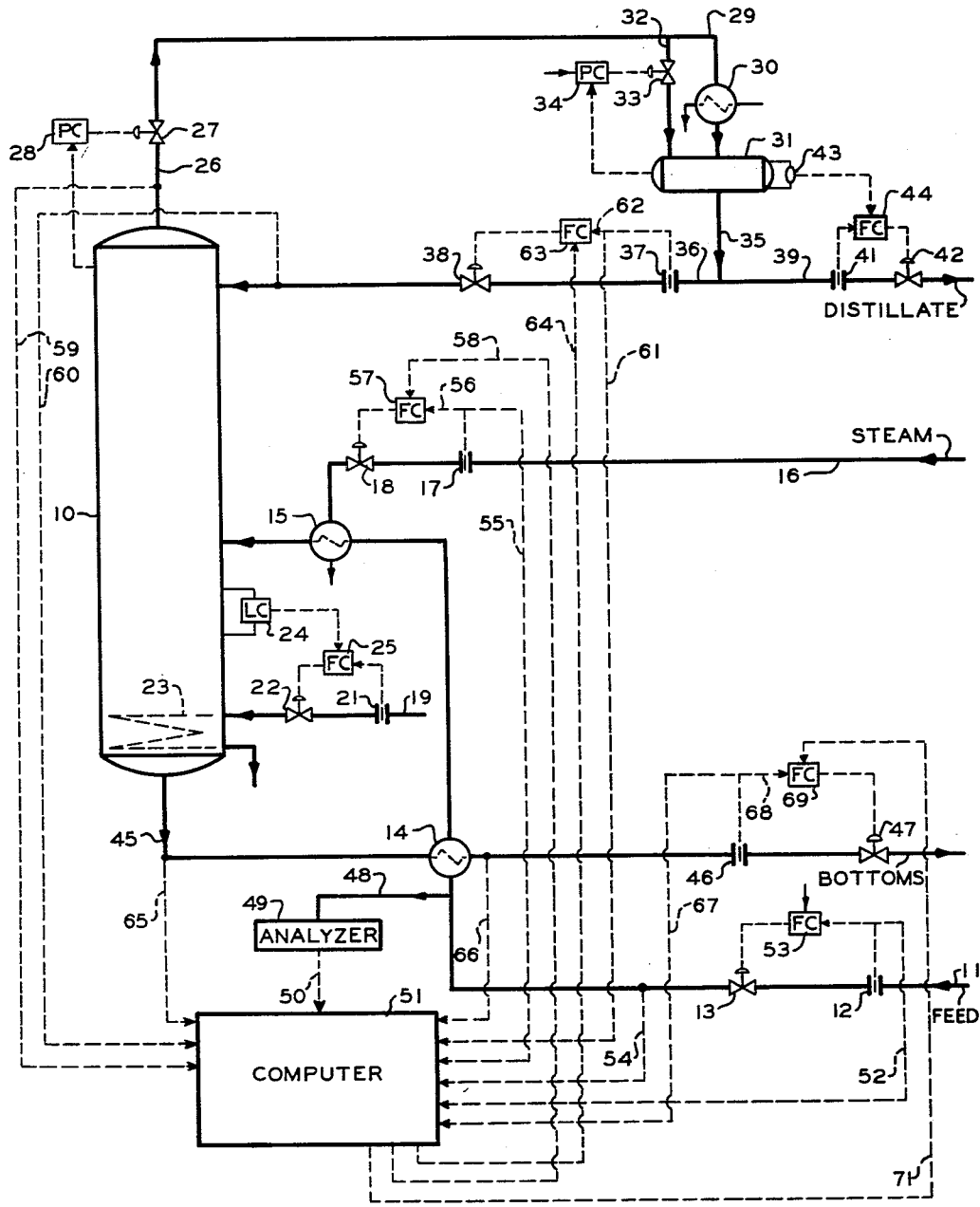

Referring now to FIGURE 1 the feed to fractionation column 10 is transmitted through line 11, orifice 12, valve 13, economizer heat exchanger 14 and preheater 15. Steam or other heating medium is transmitted through line 16, orifice 17, and valve 18 to preheater 15. Heat is supplied to a lower region of column 10 by the passage of steam or other heating medium through line 19, orifice 21, valve 22, and coil 23. The flow of heating fluid through line 19 can be controlled responsive to the liquid level in column 10 by liquid level controller 24, the output of which is connected to the set point of flow controller 25. A signal representative of the pressure drop across orifice 21 is applied to flow controller 25, the output of which is utilized to manipulate valve 22.

Vapors are removed from the top of column 10 through line 26 and valve 27. Valve 27 is manipulated by pressure controller 28 responsive to the pressure in the overhead of column 10. A portion of the thus removed vapors is passed through line 29 and condenser 30 to accumulator 31. The remainder of the thus removed vapors are passed through line 32 and valve 33 to accumulator 31. Valve 33 is manipulated by pressure controller 34 responsive to the pressure in accumulator 31. A portion of the condensate in accumulator 31 is passed through lines 35 and 36, orifice 37 and valve 38 into an upper portion of column 10 as external reflux thereto. The remainder of the condensate is removed through lines 35 and 39, orifice 41, and valve 42 as the overhead product stream. The rate of withdrawal of the overhead product is controlled responsive to the liquid level in condenser 31 by liquid level controller 43, the output of which is applied to an input of flow controller 44. A signal representative of the pressure drop across orifice 41 is applied to the second output of flow controller 44, the output of which is used to manipulate valve 42. A kettle product stream is removed from a lower portion of column 10 through line 45 and is transmitted through economizer heat exchanger 14, orifice 46, and valve 47.

Application of a predictive control system involves the solution of such equations as the external reflux flow equation, the predicted bottoms product flow equation, and the preheater steam flow equation. In the separation of a feed stream on the basis of two key components, some of the light key component will appear as an impurity in the bottoms product while some of the heavy key component will appear as an impurity in the overhead product since perfect separation is impossible. In a system where the light key component is normal butane and the heavy key component is isopentane, external reflux flow rate can be defined as:

$$R_1^2 = \frac{F^2}{[1+K(T_{01}-T_{R1})]^2}\{K_1+iC_5[K_2+K_3(nC_4) + K_4(iC_5)+K_5(C_3+iC_4)]+K_6(C_3+iC_4)\}^2$$

where $R_1$=Volume flow rate of external reflux,
$F$=Volume flow rate of feed,
$T_{01}$=Temperature of overhead,
$T_{R1}$=Temperature of external reflux,
$K$=Specific heat divided by heat of vaporization of reflux,
$K_1$ through $K_6$ are constants, the value of which depend upon the particular operation.

Similarly the predicted bottoms product flow rate can be defined as:

$$B^2 = F^2\left(\frac{K_7-C_3-iC_4-nC_4}{K_8}\right)$$

where $B$=Volume flow rate of bottom product and $K_7$ and $K_8$ equal constants, the value of which depend upon the particular operation.

Similarly the preheater stream flow can be defined as:

$$F_s = \frac{1}{h_s}F_e(F) - \frac{C_{pf}}{h_s}(F)(T_{F1}-T_{F0}) - \frac{C_{pb}}{h_s}(B)(T_{B1}-T_{B2})$$

where $F_S$=Volume flow rate of steam to feed preheater,
$h_s$=Heat content of steam to feed preheater,
$F_e$=Feed enthalpy at column entry point,
$C_{pf}$=Average specific heat of feed,
$C_{pb}$=Specific heat of bottom product stream,
$T_{F1}$=Initial temperature of feed ahead of economizer heat exchanger,
$T_{F0}$=Reference temperature,
$T_{B1}$=Bottom product temperature ahead of economizer heat exchanger,
$T_{B2}$=Bottom product temperature at exit of economizer heat exchanger.

A sample of the feed in line 11 is passed through line 48 to analyzer 49. The output of analyzer 49 is applied as an input through line 50 to computer 51. A signal representative of the pressure drop across orifice 12 is transmitted through line 52 to an input of computer 51. A signal representing a pressure drop across orifice 12 is also applied as an input to flow controller 53, the output of which is utilized to manipulate valve 13 to maintain the rate of flow of feed through line 11 substantially constant. A signal representative of the temperature in line 11 is transmitted through line 54 to an input of computer 51.

A signal representative of the pressure drop across orifice 17 is transmitted through line 55 to an input of computer 51 and through line 56 to an input of flow controller 57. An output signal of computer 51, which is representative of the desired preheater steam flow rate, is transmitted through line 58 to a second input of flow controller 57. The output of flow controller 57 is utilized to manipulate valve 18 to control the flow of steam through preheater 15.

A signal representative of the temperature of the overhead product in line 26 is transmitted through line 59 to an input of computer 51. A signal representative of a temperature of the external reflux in line 36 is transmitted through line 60 to another input of computer 51. A signal representative of the pressure drop across orifice 37 in line 36 is transmitted through line 61 to an input of computer 51 and through line 62 to an input of flow controller 63. An output of computer 51, representative of the desired external reflux flow rate, is transmitted through line 64 to a second input of flow controller 63, the output of which is utilized to manipulate valve 38.

A signal representative of the temperature of the bottoms product ahead of heat exchanger 14 is transmitted through line 65 to an input of computer 51 while a signal representative of the temperature of the bottoms product downstream of heat exchanger 14 is transmitted through line 66 to another input of computer 51. A signal representative of the pressure drop across orifice 46 is transmitted through line 67 to an input of computer 51 and through line 68 to an input of flow controller 69. An output of computer 51, representative of the predicted bottoms product flow rate is transmitted through line 71 to a second input of flow controller 69, the output of which is utilized to manipulate valve 47.

Figure 2:
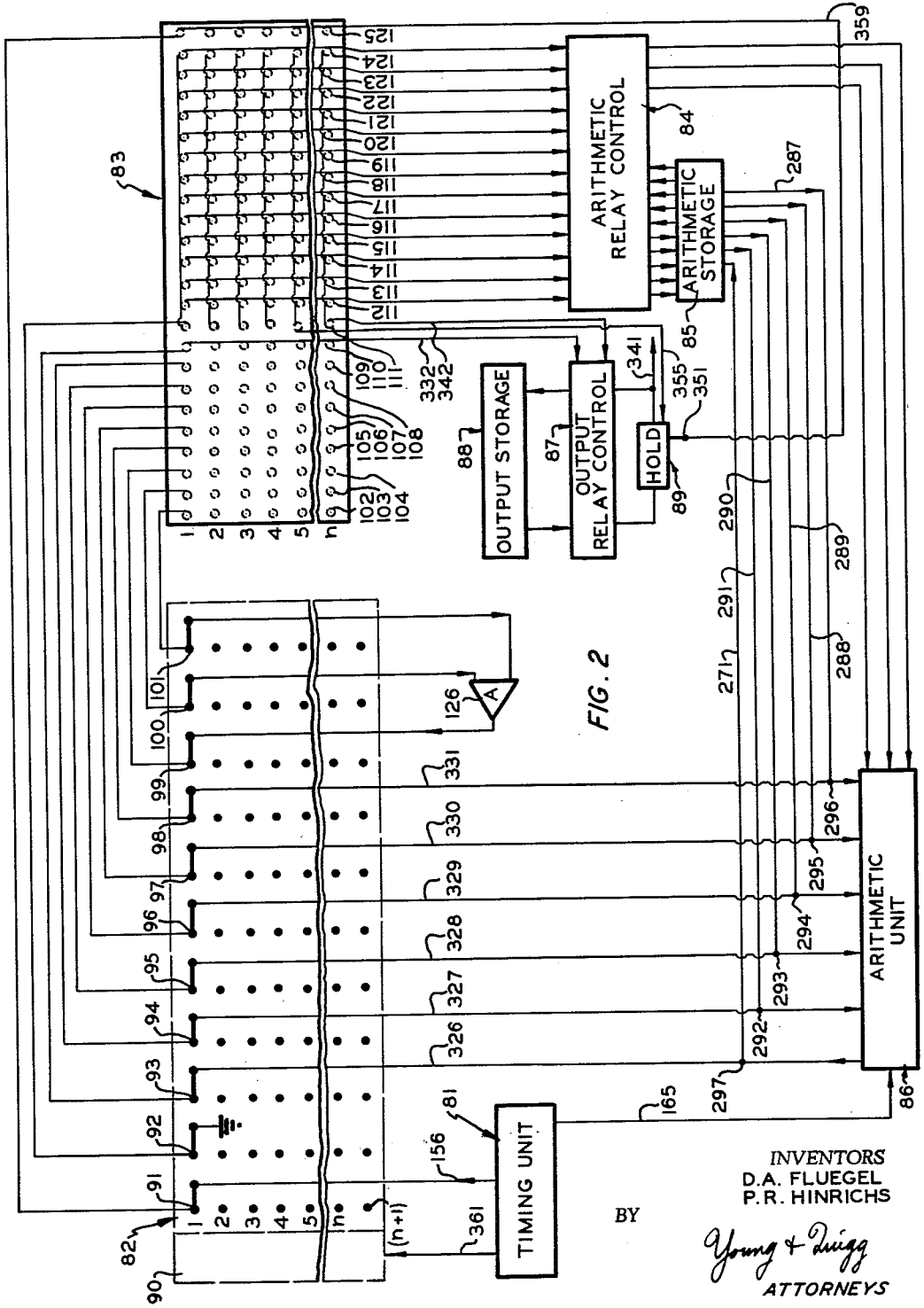
FIGURE 2 is a schematic representation of a sequentially operated analog computing system in accordance with the invention.

Referring now to FIGURE 2 there is shown a schematic representation of the components of computer 51 comprising a timing unit 81, a stepping switch 82, a pin board 83, arithmetic relay controller 84, arithmetic storage 85, arithmetic unit 86, output relay control 87, output storage 88, and output hold circuit 89. Stepping switch 82 and pin board 83 are each provided with a suitable number, such as 25, of computer steps or channels designated as 1, 2, 3, 4, 5 . . . n. It is desirable that there be a computer step or channel for each discrete step in the computation necessary to achieve a solution of the equation or equations being computed. If it is desirable to control more than one fractionation system, a plurality of stepping switches and pin boards can be utilized with the stepping switch arms connected in parallel. Stepping switch 82 also contains an additional channel ($n+1$) which is the "home" position for the stepping switch. This leaves the arms of the stepping switch open circuited except the one currently scanning the pin board. When a plurality of stepping switches are utilized, the stepping of the correct stepping switch is controlled by a timing unit 81 which will be described hereinafter. Stepping switch 82 comprises a stepping switch solenoid 90 and a plurality of rows of contacts 91–101. While 11 contacts have been illustrated per channel, any suitable number can be utilized. Pin board 83 contains a plurality of rows 102–125.

While pin board 83 can be arranged in any suitable manner, for purposes of illustration rows 102 and 103 correspond to low level input while row 104 corresponds to a high level output. Rows 105–109 correspond to five different input variables. Obviously, while only five have been illustrated, any suitable number can be utilized. Row 110 transmits an answer to the appropriate hold circuit and provides temporary answers for trouble shooting and equipment debugging. Row 111 corresponds to a readout instruction. Rows 112–116 correspond to means for applying the output signal to one of five different storage capacitors while rows 117–121 correspond to means for utilizing the charge stored on a respective one of the five storage capacitors as an input. Rows 122 and 123 determine the arithmetic operation to be performed while row 124 determines the gain utilized. Row 125 corresponds to a comparison instruction signal to effect the comparison of the present solution to an equation with a previous solution to the equation.

The contacts corresponding to rows 91, 92, 93, 94, 95, 96, 97, 98, 99, 100 and 101 in each channel of stepping switch 82 are connected to the contacts in rows 111, 110, 109, 108, 107, 106, 105, 104, 103, and 102, respectively, of the respective channel. The contactors of rows 100 and 101 are connected to first and second inputs, respectively, of amplifier 126, the output of which is connected to the contactor of row 99.

Thus the input variables are applied through rows 105–109 on pin board 83 and sequenced to the arithmetic unit 86 through stepping switch 82. At each computing step the appropriate relays in the arithmetic unit 86 are actuated according to the position of the pins in rows 122, 123 and 124. The pins cause the respective relays to be grounded through stepping switch contact 92. Similarly relays connect the outputs and inputs of the arithmetic unit 86 to the appropriate capacitor in arithmetic storage 85.

Figure 3:
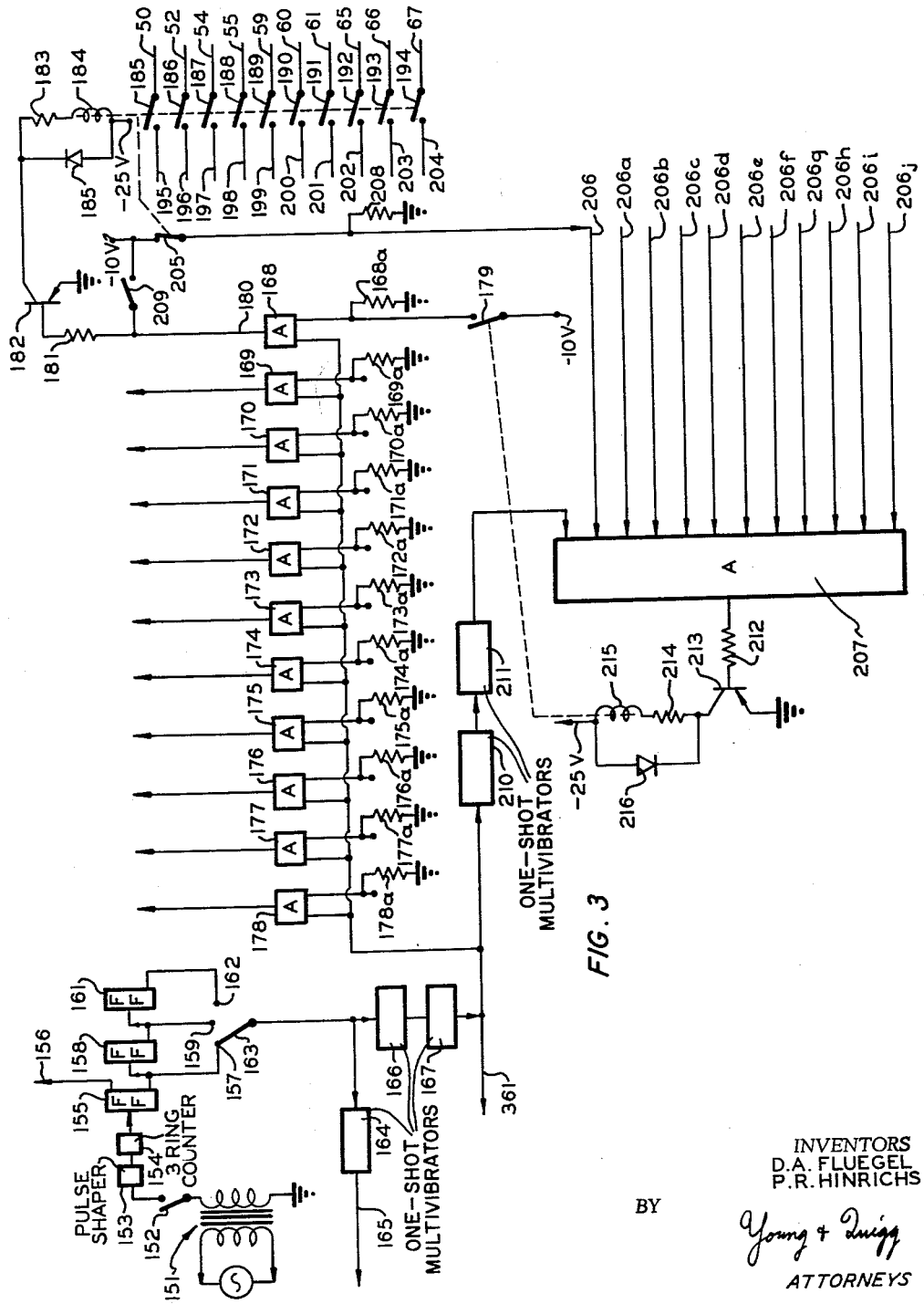
FIGURE 3 is a timing unit which can be utilized in the system of FIGURE 2.

Referring now to FIGURE 3 the primary coil of transformer 151 is connected across a suitable A.C. power supply while the secondary coil thereof is connected in series with switch 152 between ground and the input of pulse shaper 153. The output of pulse shaper 153 is applied to the input of a three ring counter 154. When the A.C. power supply furnishes a 60 c.p.s. signal, the output of counter 154 will be 20 c.p.s. The output of counter 154 is applied to the input of flip flop circuit 155. A first position output of flip flop circuit 155 is applied through line 156 to the switch contactor corresponding to contacts 91 in stepping switch 82. The second position output of flip flop circuit 155 is applied to terminal 157 and to the input of flip flop circuit 158. The output of flip flop circuit 158 is applied to terminal 159 and to the input of flip flop circuit 161, the output of which is applied to terminal 162. A switch 163 is provided to utilize a selected one of terminals 157, 159 and 162 as the output terminal, thus giving the choice of 10 c.p.s., 5 c.p.s., and 2.5 c.p.s. Switch 163 is connected to input of one-shot multivibrator 164, the output of which is transmitted through line 165 to arithmetic unit 86. Switch 163 is also connected to an input of one-shot multivibrator 166, the output of which is connected to the input of one-shot multivibrator 167. The output of multivibrator 167 is applied as a first input to "and" circuits 168–178. The second inputs of "and" circuits 168–178 are connected to respective contacts of stepping switch 179, the contactor of which is connected to a suitable source of potential, such as —10 volts. Each of said contacts is connected through a respective resistor 168a–178a to ground. While eleven "and" circuits have been shown, any suitable number can be utilized, it being desirable to have one "and" circuit for each fractionation column to be controlled. The output of each "and" circuit is applied to a switch corresponding to the respective fractionator. For purposes of simplicity only the circuit corresponding to "and" circuit 168 will be described, it being understood that each of the circuits will be substantially identical. The output of "and" crcuit 168 is applied through line 180 and resistor 181 to the base of transistor 182. The emitter of transistor 182 is connected to ground while the collector is connected through resistance 183 and relay coil 184 to a suitable source of potential, such as —25 volts. A diode 185 is connected in parallel with resistor 183 and relay coil 184. The passage of current through coil 184 actuates switches 185–194 to connect lines 50, 52, 54, 55, 59, 60, 61, 65, 66 and 67, respectively, of the first fractionator to lines 195–204, respectively. Lines 195–204 from each fractionator are connected in parallel with the corresponding lines from each of the other fractionators and then connected into the appropriate positions in columns 105–109 of pin board 83. Relay coil 184 also actuates normally closed switch 205 in line 206 to disconnect a suitable source of potential, such as —10 volts, from an input of "and" circuit 207, which is connected to ground through resistor 208. A normally opened manual advance switch 209 can be connected between the —10 volt potential source and the output of "and" circuit 168 to provide for manual actuation of relay coil 184. Lines 206a–j correspond to the line 206 for fractionators 2–11 and are connected to respective inputs of "and" circuit 207. Where it is desired to analyze and/or control a fewer number of fractionators, the respective inputs to "and" circuit 207 corresponding to the omitted fractionators can be connected to a —10 volts potential source by any suitable means. The output of multivibrator 167 is applied to the input of one-shot multivibrator 210, the output of which is applied to the input of one-shot multivibrator 211, the output of which is applied to an input of "and" circuit 207. The output of "and" circuit 207 is applied through resistor 212 to the base of transistor 213, the emitter of which is connected to ground. The collector of transistor 213 is connected through resistance 214 and relay coil 215 to a —25 volt potential source. A diode 216 is connected in parallel with resistance 214 and relay coil 215. The passage of a pulse of current through relay coil 215 actuates stepping switch 179 to cause stepping switch 179 to move to the next position.

Referring now to FIGURE 4 there is shown a timing diagram of a typical operation of timing unit 81 wherein curve 221 represents the input to multivibrators 164 and 166; curve 222 represents the output of multivibrator 164; curve 223 represents the output of multivibrator 166; curve 224 represents the output of multivibrator 167, curve 225 represents the output of multivibrator 210 and curve 226 represents the output of one-shot multivibrator 211.

Referring now to FIGURE 5 there is shown the arithmetic relay control unit wherein first terminals of relay coils 231–243 are connected to rows 112–124 of pin board 83, respectively, and the second terminals of the relay coils are connected to a suitable source of potential, such as —10 volts. Diodes 244 through 256 are connected in parallel with relay coils 231–243, respectively, to prevent overloading.

Referring now to FIGURE 6, arithmetic storage 85 is shown as comprising a plurality of storage capacitors 261–265. First terminals of capacitors 261–265 are connected to ground through switches 231a–235a and resistances 266–270, respectively. The second terminals of capacitors 261–265 are connected to output terminal 297 (FIGURE 2) of arithmetic unit 86 by line 271 and switches 231b–235b, respectively. Switches 231a and 231b are actuated to a closed position by the occurrence of a pin in row 112 of pin board 83 corresponding to the current computing step being performed. Similarly switches 232a and 232b are actuated to a closed position by a pin in the current channel of row 113; switches 233a and 233b are actuated to the closed position by a pin in the current channel of row 114; switches 234a and 234b are actuated to a closed position by a pin in the current channel of row 115; and switches 235a and 235b are actuated to a closed position by a pin in the current channel of row 116.

The output of capacitors 261–265 are connected in parallel with operational amplifiers 272–276, respectively, by switches 236b and 236c, 237b and 237c, 238b and 238c, 239b and 239c, 240b and 240c, respectively. Zener diodes 277 and 278 are connected in opposing relationship with each other and in parallel with amplifier 272; Zener diodes 279 and 280 are connected in opposing relationship with each other and in parallel with amplifier 273; Zener diodes 281 and 282 are connected in opposing relationship with each other and in parallel with amplifier 274; Zener diodes 283 and 284 are connected in opposing relationship with each other and in parallel with amplifier 275; Zener diodes 285 and 286 are connected in opposing relationship with each other and in parallel with amplifier 276. The outputs of amplifiers 272–276 are connected through switches 236a–240a and lines 287–291 to the input terminals 292–296, respectively, of arithmetic unit 86. Switches 236a, 236b, and 236c are actuated by relay coil 236 upon the occurrence of a pin in column 117 of pin board 83 corresponding to the current computing step being performed. Similarly switches 237a, 237b, and 237c are actuated upon the occurrence of a pin in row 118 corresponding to the current computing step; switches 238a, 238b, and 238c are actuated upon the occurrence of a pin in row 119 corresponding to the current computing step; switches 239a, 239b and 239c are actuated upon the occurrence of a pin in row 120 corresponding to the current computing step; switches 240a, 240b and 240c are actuated upon the occurrence of a pin in row 121 corresponding to the current computing step.

Referring now to FIGURE 7 arithmetic unit 86 comprises four logarithmic function generators 301, 302, 303, 304 and two 1/2 logarithmic function generators 305 and 306, operational amplifiers 307 and 308, resistances 309–320, switches 241a–241j, switches 242a–242e, and switches 243a and 243b. Relay coil 241 (FIGURE 5) actuates switches 241a–241j upon the occurrence of a pin in row 122 of pin board 83 corresponding to the current computing step. Relay coil 242 (FIGURE 5) actuates switches 242a–242e upon the occurrence of a pin in row 123 of pin board 83 corresponding to the current computing step. Relay 243 (FIGURE 5) actuates switches 243a and 243b upon the occurrence of a pin in row 123 of pin board 83 corresponding to the current computing step.

In order for arithmetic unit 86 to perform multiplication, switches 241a, 241b, and 241c connect input terminals 296, 295, and 294 to the inputs of log function generators 301, 302 and 305, respectively, the outputs of which are connected through switch 241f to an input of operational amplifier 307. The output of amplifier 307 is connected through switch 243a, either resistor 314 or resistor 315, and switch 241h to the input of amplifier 307. As the resistances of resistors 314 and 315 are of different values, the position of switch 243a determines the gain of amplifier 307. Zener diodes 321 and 322 are connected in opposing relationship with respect to each other and in parallel with amplifier 307. The output of amplifier 307 is transmitted through resistor 318 and switch 241i to an input of amplifier 308.

Input terminals 292 and 293 are connected by switches 241e and 241b to inputs of logarithmic function generators 306 and 303, the outputs of which are transmitted through switch 241g to an input of amplifier 308. The output of amplifier 308 is connected through logarithmic function generator 304 and switch 241j to an input of amplifier 308. Zener diodes 323 and 324 are connected in opposing relationship to each other and in parallel with amplifier 308. The output of amplifier 308 is transmitted through switch 325a to output terminal 297.

In order to perform addition, switch 242a connects input terminals 292, 293 and 294 through resistors 309, 310, and 311, respectively, to an input of amplifier 307. The output of amplifier 307 is transmitted through resistor 316 and switch 242c to an input of amplifier 307. The output of amplifier 307 is also transmitted through resistors 317 and switch 242d to an input of amplifier 308.

In order to perform subtraction, switch 242b connects input terminals 295 and 296 through resistances 312 and 313 to an input of amplifier 308. The output of amplifier 308 is connected through switch 243b, either resistor 319 or resistor 320, and switch 242e to an input of amplifier 308. As the resistances of resistors 319 and 320 are of different values, the position of switch 243b determines the gain of amplifier 308. The output of amplifier 308 is transmitted through switch 325a to output terminal 297.

In order to increase the accuracy of the computer, a timing signal is transmitted from timing unit 81 through line 165 and resistor 366 to the base of transistor 298, the emitter of which is connected to ground. The collector of transistor 298 is connected through resistor 299 and relay coil 325 to a suitable source of potential, such as −25 volts. A diode 300 is connected in parallel with resistor 299 and coil 325. The timing signal actuates switch 325a to an open position before stepping switch 82 is cocked and then returns switch 325a to a closed position after the other switching transients have ceased.

External inputs are pinned into the appropiate row and channel of rows 105–109. Each pin position in rows 105–109 is connected to a respective contacts of rows 98, 97, 96, 95, and 94, respectively. The contactors corresponding to rows 94–98 are connected through lines 327–331 to input terminals 292–296 of arithmetic unit 86, respectively. The output terminal 297 is connected through line 326 to the switch contactor corresponding to row 93 in stepping switch 82. Each of the contacts in row 93 are connected to respective pin openings in row 110 of pin board 83. A plurality of output circuits each comprising an input line 332, an output control 87, an output storage 88, and a hold circuit 89, are provided for each equation for which an output signal is desired. Each of the output circuits is connected to the respective pin position in row 110 corresponding to the channel in which the solution to the respective equation will be obtained. While a plurality of output circuits can be utilized, only one will be described for the sake of simplicity.

Figure 8:
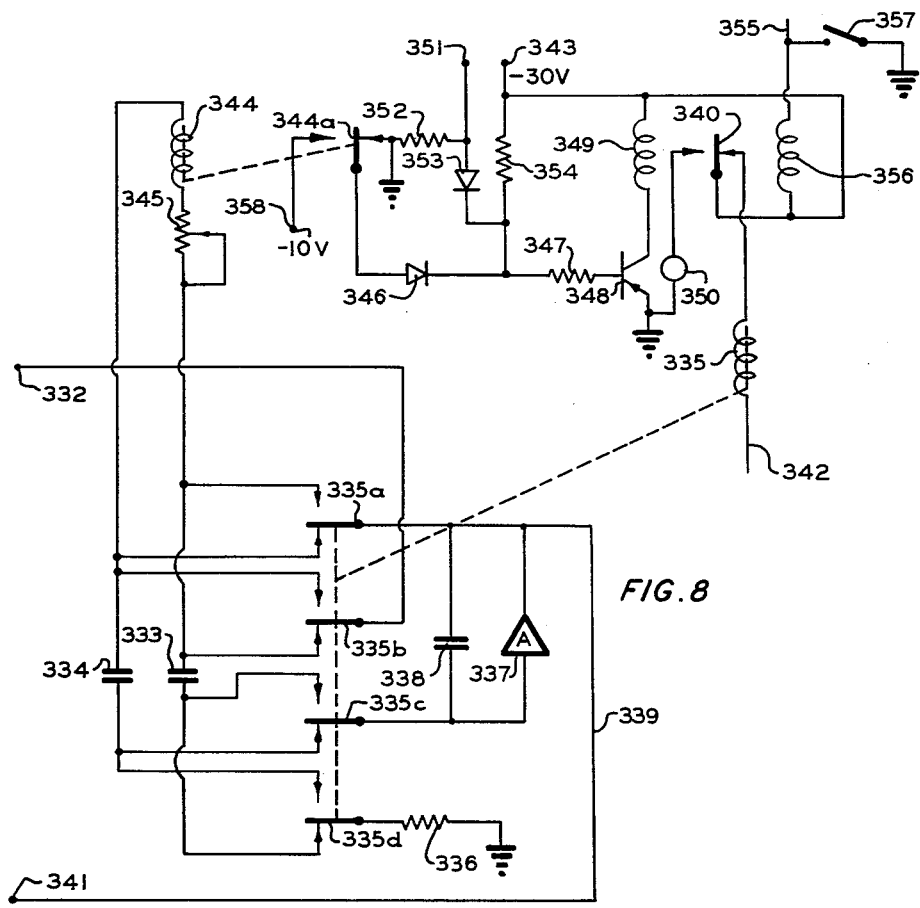
FIGURE 8 is a schematic representation of a hold and comparison circuit which can be utilized in the system of FIGURE 2.

Referring now to FIGURE 8 there is shown a hold circuit comprising capacitors 333 and 334. Line 332 is connected through switch 335b, capacitor 333, switch 335d and resistance 336 to ground. Capacitor 334 is connected in parallel with amplifier 337 by switches 335a and 335c. A capacitor 338 is also connected in parallel with amplifier 337. The output of amplifier 337 is transmitted through line 339 to terminal 341 and represents the solution to the equation. Where it is desired to control a variable of the process in accordance with the solution of the equation, the signal on output terminal 341 can be transmitted to the appropriate control means. Thus for the control of the withdrawal of bottoms product from fractionator 10 in FIGURE 1, the output terminal 341 of the output circuit corresponding to the predicted bottoms product flow rate equation would be connected through line 71 to flow controller 69 to manipulate valve 47.

When stepping switch 82 is stepped to a channel in which line 342 is plugged into row 111, a first terminal of relay coil 335 is grounded through a contact in row 92 of stepping switch 82. The second terminal of relay coil is connected to a first terminal of switch 340. The contactor of switch 340 is connected to a suitable source of potential 343 such as −30 volts. The passage of current through relay coil 335 actuates switches 335a–335d to connect one of capacitors 333 and 334 to input line 332 and to connect the other one of capacitors 333 and 334 in parallel with amplifier 337, thus causing the readout of the capacitor just previously charged.

If it is desired to compare the newly calculated answer with a previously calculated answer, relay coil 344 and potentiometer 345 are connected in series between first terminals of capacitors 333 and 334. The contactor of potentiometer 345 is connected to one terminal thereof and the position of the contactor determines the value of the predetermined amount of difference between the two signals which will be tolerated. Thus, if the values stored in capacitors 333 and 334 exceed this predetermined amount, relay coil 344 will actuate switch 344a to connect the terminal 358 of a suitable source of potential, such as −10 volts, through diode 346 and resistance 347 to the base of transistor 348. The emitter of transistor 348 is connected to ground while the collector is connected through relay coil 349 to potential source 343. Thus the actuation of switch 344a changes transistor 348 to a conducting state and a pulse of current is passed through coil 349 causing the contactor of switch 340 to be connected through alarm 350 to ground. In order for the comparison circuit to be actuated, a pin must be inserted in the appropriate position of row 125 to connect terminal 351 through line 359, row 125, a contact of row 91, and line 156 to timing unit 81. Terminal 351 is connected to ground through resistance 352, and to the base of transistor 348 through diode 353 and resistance 347. The base of transistor 348 is also connected to potential source 343 through resistances 347 and 354. In the channel prior to the channel wherein the solution to the next equation is achieved, one terminal of line 355 can be plugged into row 111 to connect relay coil 356 to ground through contact 92 to return switch 340 to its original position and to discontinue the alarm. If desired, a manual switch 357 can be utilized to connect relay coil 356 between potential source 343 and ground to discontinue the alarm. Thus, the comparison circuit has the feature that if a newly calculated answer differs from a previously calculated answer by some preset amount determined by the setting of potentiometer 345, the old answer is saved and an alarm can be given. The comparison circuit is automatically reset if a new answer is calculated that is within the range provided.

Referring now to FIGURES 9, 10, 11, 12, and 13, there is shown the specific connections of the components in arithmetic unit 86 for the solution of the equation $$B^2 = F^2\left(\frac{K_7 - C_3 - iC_4 - nC_4}{K_8}\right)^2$$

where $K_7 = 9.08$ and $K_8 = 2.85$.

Figure 9:
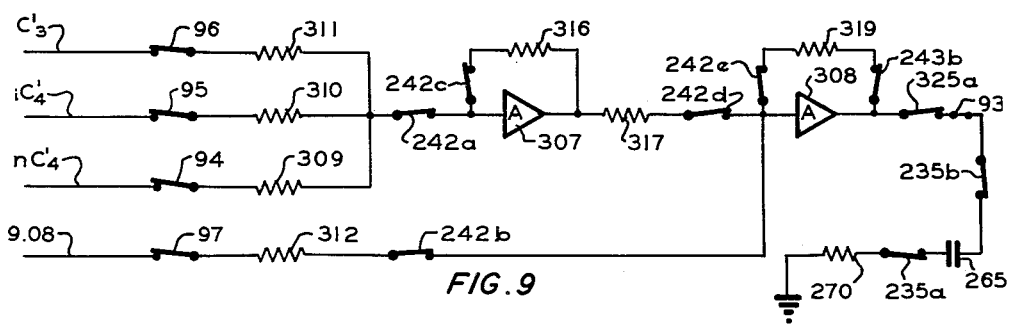

For the sake of simplicity, only FIGURE 9 will be described in detail as each of the invidiual elements has been previously described. Referring now to FIGURE 9 the output of analyzer 49 representative of the $C_4$ content in the feed stream is applied through the pin position in row 109 and channel 1 of pin board 83 to the contactor of row 94 in stepping switch 82, while a signal representative of the $iC_4$ content of the feed stream is applied through a pin position in row 108 of channel 1 to the contactor of row 95 in stepping switch 82, a signal representative of the $C_3$ content of the feed stream is applied through the pin position in row 107 of channel 1 to the contactor of row 96, and a signal representative of the value 9.08 is applied through the pin position in row 106 of channel 1 to the contactor of row 97 of stepping switch 82. The contactors of rows 94, 95 and 96 are connected through resistors 309, 310, and 311, respectively, and switch 242a to the input of amplifier 307. The output of amplifier 307 is transmitted through resistor 316 and switch 242c to an input of amplifier 307. The output of amplifier 307 is applied through resistor 317 and switch 242d to an input of amplifier 308. The contactor of row 97 in stepping switch 82 is connected through resistor 312 and switch 242b to an input of amplifier 308. The output of amplifier 308 is applied through switch 243b, resistance 319, and switch 242e to an input of amplifier 308. The output of amplifier 308 is transmitted through switch 325a, switch 235b, capacitor 265, switch 235a and resistor 270 to ground. Thus, the charge stored in capacitor 265 is representative of $-9.08 + C_3 + iC_4 + nC_4$.

Figure 10:
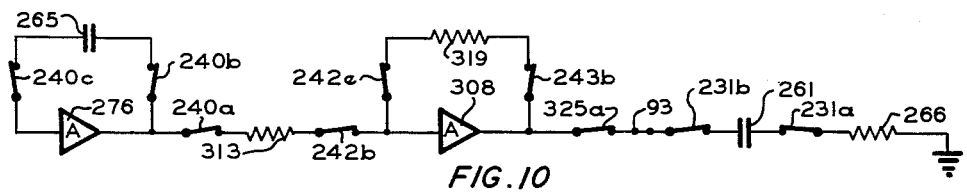

In FIGURE 10 capacitor 265 is connected in parallel with amplifier 276 through switches 240b and 240c to supply the input signal. The charge stored in capacitor 261 is representative of $+9.08 - C_3 - iC_4 - nC_4$.

Figure 11:
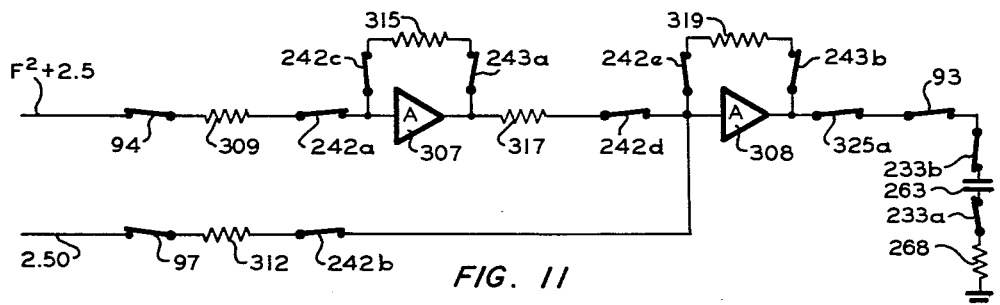
FIGURES 9, 10, 11, 12 and 13 are schematic representations of the arrangements of the components of the arithmetic unit and the arithmetic storage unit for the performance of various steps in the solution of a particular equation.

In FIGURE 11 a signal representative of the pressure drop across orifice 12 is applied through the pin position in row 109 of channel 3 of pin board 83, the contactor of row 94, resistor 309 and switch 242a to an input of amplifier 307. A signal representative of the value 2.5 is applied through the pin position in row 106 of channel 3, the contactor of row 97, resistor 312 and switch 242b to an input of amplifier 308. The charge stored in capacitor 263 is representative of $F^2$.

Figure 12:
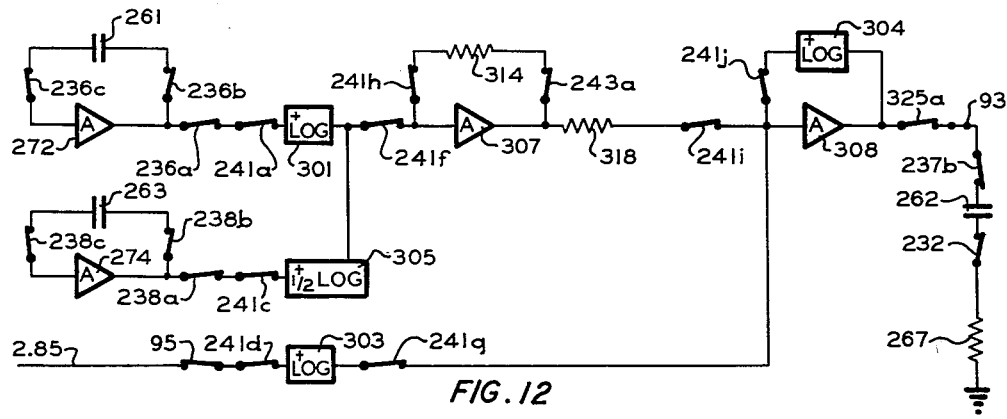
Figure 13:
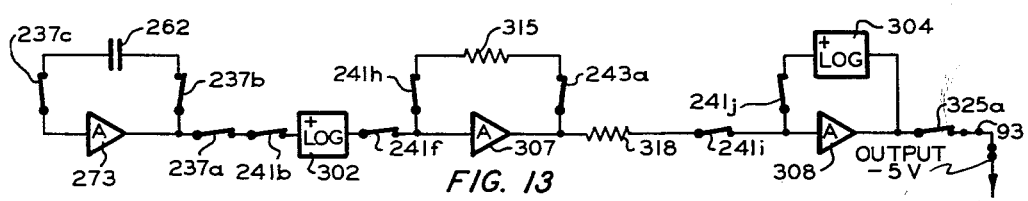

In FIGURE 12 capacitors 261 and 263 provide the input signals and the charge stored in capacitor 262 is representative of $F(9.08 - C_3 - iC_4 - nC_4)/2.85$. In FIGURE 13 capacitor 262 provides the input signal, and the output signal which is transmitted to one of capacitors 333 and 334 in the respective hold circuit is representative of $$F^2\left(\frac{9.08 - C_3 - iC_4 - nC_4}{2.85}\right)^2 = B^2$$

While the invention has been described in terms of a specific embodiment, reasonable variations and modifications are possible within the scope of the disclosure, the drawings and the appended claims to the invention. For example, hyperbolic function generators can be utilized instead of or in addition to the logarithmic generators. Means other than a pin board can be utilized where only certain equations are to be computed and flexibility is not essential. The switches can be arranged to apply any number of inputs to either amplifier, and any desired number of amplifiers can be utilized.

We claim:
1. Computing apparatus comprising:
  (1) a pin board having a plurality of channels; each channel having a plurality of input variable positions, a plurality of output capacitor positions, a plurality of input capacitor positions, a plurality of mode positions, and an output position;
  (2) a stepping switch having a plurality of channels corresponding to said pin board plurality of channels, each channel of said stepping switch having a plurality of contacts corresponding to said plurality of input variable positions and said output position, and a solenoid;
  (3) an arithmetic unit comprising a plurality of input terminals, first and second amplifiers, a plurality of function generators, first switching means for connecting a first group of said plurality of function generators between respective ones of a first group of said input terminals and inputs of said first amplifier, second switching means for connecting a second group of said function generators between respective ones of a second group of said input terminals and inputs of said second amplifier, a first plurality of resistors, third switching means for connecting a first group of said first plurality of resistors between respective ones of a third group of said input terminals and inputs of said first amplifier, fourth switching means for connecting a second group of said first plurality of resistors between respective ones of a fourth group of said input terminals and inputs of said second amplifier, a plurality of first feedback circuits adapted to be connected between the output and an input of said first amplifier, fifth switching means for selectively connecting one of said first feedback circuits between the output and an input of said first amplifier, a plurality of second feedback circuits adapted to be connected between the output and an input of said second amplifier, sixth switching means for selectively connecting one of said second feedback circuits between the output and an input of said second amplifier, a second plurality of resistors, seventh switching means for connecting the output of said first amplifier through one of said second plurality of resistors to an input of said second amplifier; and means for actuating said first, second, third, fourth, fifth, sixth and seventh switching means in accordance with the occurrence and position of pins in said plurality of mode positions on said pin board;

(4) storage means comprising a plurality of capacitors, eighth switching means for selectively connecting one of said plurality of capacitors between the output of said second amplifier and ground, ninth switching means adapted to selectively connect at least one of said plurality of capacitors to respective ones of said plurality of input terminals, and tenth switching means for selectively connecting one of said plurality of capacitors to an output terminal, and timing means for relatively actuating said eighth switching means in accordance with the occurrence and positions of pins in said plurality of output capacitor positions, means for actuating said ninth switching means in accordance with the occurrence and position of pins in said plurality of input capacitor positions, and means for actuating said tenth switching means in accordance with the occurrence of a pin in said output position; and (5) timing means for actuating said stepping switch solenoid at predetermined intervals.

2. Computing apparatus comprising a plurality of input terminals, first and second amplifiers, a plurality of function generators, first switching means for connecting a first group of said plurality of function generators between respective ones of a first group of said input terminals and inputs of said first amplifier, second switching means for connecting a second group of said function generators between respective ones of a second group of said input terminals and inputs of said second amplifier, a first plurality of resistors, third switching means for connecting a first group of said first plurality of resistors between respective ones of a third group of said input terminals and inputs of said first amplifier, fourth switching means for connecting a second group of said first plurality of resistors between respective ones of a fourth group of said input terminals and inputs of said second amplifier, a plurality of first feedback circuits adapted to be connected between the output and an input of said first amplifier, fifth switching means for selectively connecting one of said first feedback circuits between the output and an input of said first amplifier, a plurality of second feedback circuits adapted to be connected between the output and an input of said second amplifier, sixth switching means for selectively connecting one of said second feedback circuits between the output and an input of said second amplifier, a second plurality of resistors, seventh switching means for connecting the output of said first amplifier through one of said second plurality of resistors to an input of said second amplifier; and timing means for selectively actuating said first, second, third, fourth, fifth, sixth and seventh switching means at predetermined intervals.

3. Computing apparatus comprising a plurality of input terminals, first and second amplifiers, a plurality of function generators, first switching means for connecting a first group of said plurality of function generators between respective ones of a first group of said input terminals and inputs of said first amplifier, second switching means for connecting a second group of said function generators between respective ones of a second group of said input terminals and inputs of said second amplifier, a first plurality of resistors, third switching means for connecting a first group of said first plurality of resistors between respective ones of a third group of said input terminals and inputs of said first amplifier, fourth switching means for connecting a second group of said first plurality of resistors between a fourth group of said input terminals and inputs of said second amplifier, a plurality of feedback circuits adapted to be connected between the output and an input of said first amplifier, fifth switching means for selectively connecting one of said first feedback circuits between the output and an input of said first amplifier, a plurality of second feedback circuits adapted to be connected between the output and an input of said second amplifier, sixth switching means for selectively connecting one of said second feedback circuits between the output and an input of said second amplifier, a second plurality of resistors, seventh switching means for connecting the output of said first amplifier through one of said second plurality of resistors to an output of said second amplifier; a plurality of storage means, eighth switching means for selectively connecting one of said plurality of storage means between the output of said second amplifier and ground, ninth switching means adapted to selectively connect at least one of said plurality of storage means to respective ones of said plurality of input terminals, tenth switching means for selectively connecting one of said plurality of storage means to an output terminal, and timing means for selectively actuating said first, second, third, fourth, fifth, sixth, seventh, eighth, ninth and tenth switching means at predetermined intervals.

4. Apparatus in accordance with claim 3 wherein said timing means comprises a plurality of relay coils, a pin board having a plurality of channels, each channel containing a pin position corresponding to each of said plurality of relay coils, means for scanning said pin board channel by channel and for applying a source of potential across the relay coils corresponding to the pin positions containing a pin therein, each of said relay coils being adapted to actuate at least one of said first, second, third, fourth, fifth, sixth, seventh, eighth, ninth, and tenth switching means.

5. Apparatus in accordance with claim 3 further comprising first and second output capacitors, a third amplifier, eleventh switching means for selectively connecting one of said first and second output capacitors between said output terminal and ground, twelfth switching means for selectively connecting the other of said first and second output capacitors between an output terminal of said third amplifier and an input terminal of said third amplifier, and timing means for actuating said eleventh and twelfth switching means at predetermined intervals, whereby the output of said third amplifier is representative of the solution to an equation being completed.

6. Apparatus in accordance with claim 5 further comprising a relay coil and a potentiometer connected in series between first terminals of said first and second output capacitors, the contactor of said potentiometer being connected to one end thereof, an alarm means, thirteenth switching means, a source of potential, said thirteenth switching means being adapted to connect said alarm means to said source of potential upon the occurrence of a predetermined difference between the charges stored on said first and second output capacitors.

References Cited in the file of this patent

UNITED STATES PATENTS

| | | |
|---|---|---|
| 2,955,762 | Dietrich | Oct. 11, 1960 |
| 2,958,466 | Alway | Nov. 1, 1960 |
| 2,998,186 | Meyer | Aug. 29, 1961 |
| 3,050,673 | Widmer | Aug. 21, 1962 |

OTHER REFERENCES

Korn et al.: Electronic Analog Computers, McGraw-Hill Book Co., Inc.

Korn: "Repetitive Analog Computers at the University of Arizona," Instruments and Control Systems, September 1960, pp. 1551–1553.

Andrews: "The Dynamic Storage Analog Computer—DYSTAC," Instruments and Control Systems, September 1960, pp. 1540–1544.

UNITED STATES PATENT OFFICE
CERTIFICATE OF CORRECTION

Patent No. 3,143,643　　　　　　　　　　　　　　August 4, 1964

Dale A. Fluegel et al.

It is hereby certified that error appears in the above numbered patent requiring correction and that the said Letters Patent should read as corrected below.

Column 12, line 37, for "output" read -- input --.

Signed and sealed this 8th day of December 1964.

(SEAL)
Attest:

ERNEST W. SWIDER
Attesting Officer

EDWARD J. BRENNER
Commissioner of Patents